United States Patent [19]
Zahn

[11] Patent Number: 5,833,477
[45] Date of Patent: Nov. 10, 1998

[54] DEVICE FOR TRANSMITTING ELECTRICAL SIGNALS BETWEEN COMPONENTS WHICH CAN BE ROTATED RELATIVE TO ONE ANOTHER

[75] Inventor: Matthias Zahn, Stockstadt, Germany

[73] Assignee: Petri AG, Aschaffenburg, Germany

[21] Appl. No.: 817,970

[22] PCT Filed: Dec. 15, 1995

[86] PCT No.: PCT/DE95/01839

§ 371 Date: Sep. 11, 1997

§ 102(e) Date: Sep. 11, 1997

[87] PCT Pub. No.: WO96/25307

PCT Pub. Date: Aug. 22, 1996

[30] Foreign Application Priority Data

Feb. 16, 1995 [DE] Germany .................. 195 06 865.3

[51] Int. Cl.⁶ .................................................. H01R 35/04
[52] U.S. Cl. ............................................. 439/164; 439/15
[58] Field of Search ........................................ 439/164, 15

[56] References Cited

U.S. PATENT DOCUMENTS

| | | | |
|---|---|---|---|
| 5,102,061 | 4/1992 | Suzuki et al. .................. | 439/15 |
| 5,277,604 | 1/1994 | Ida et al. ...................... | 439/164 |
| 5,314,341 | 5/1994 | Kazita et al. .................. | 439/164 |
| 5,328,112 | 7/1994 | Obata .......................... | 242/388 |

FOREIGN PATENT DOCUMENTS

| | | |
|---|---|---|
| 0186935 | 7/1986 | European Pat. Off. . |
| 2667457 | 4/1992 | France . |
| 3537783 | 4/1987 | Germany . |
| 4111699 | 2/1992 | Germany . |
| 4301248 | 7/1993 | Germany . |

*Primary Examiner*—Gary F. Paumen
*Attorney, Agent, or Firm*—Christie, Parker & Hale, LLP

[57] ABSTRACT

A device for transmitting electrical signals between components which can be rotated relative to one another, in particular in motor vehicle steering systems, with a rotatable hub surrounded by a stationary housing and with at least one electrical lead which is connected at one end to the rotatable hub and at the other end to a stationary component. The device is characterized in that the electrical lead is connected and guided such that, in both end positions when the hub rotates in the clockwise direction or in the counterclockwise direction, the electrical lead is wound up on the hub in the respective opposite direction, whereas the electrical lead is unwound from the hub in the center position thereof.

17 Claims, 8 Drawing Sheets

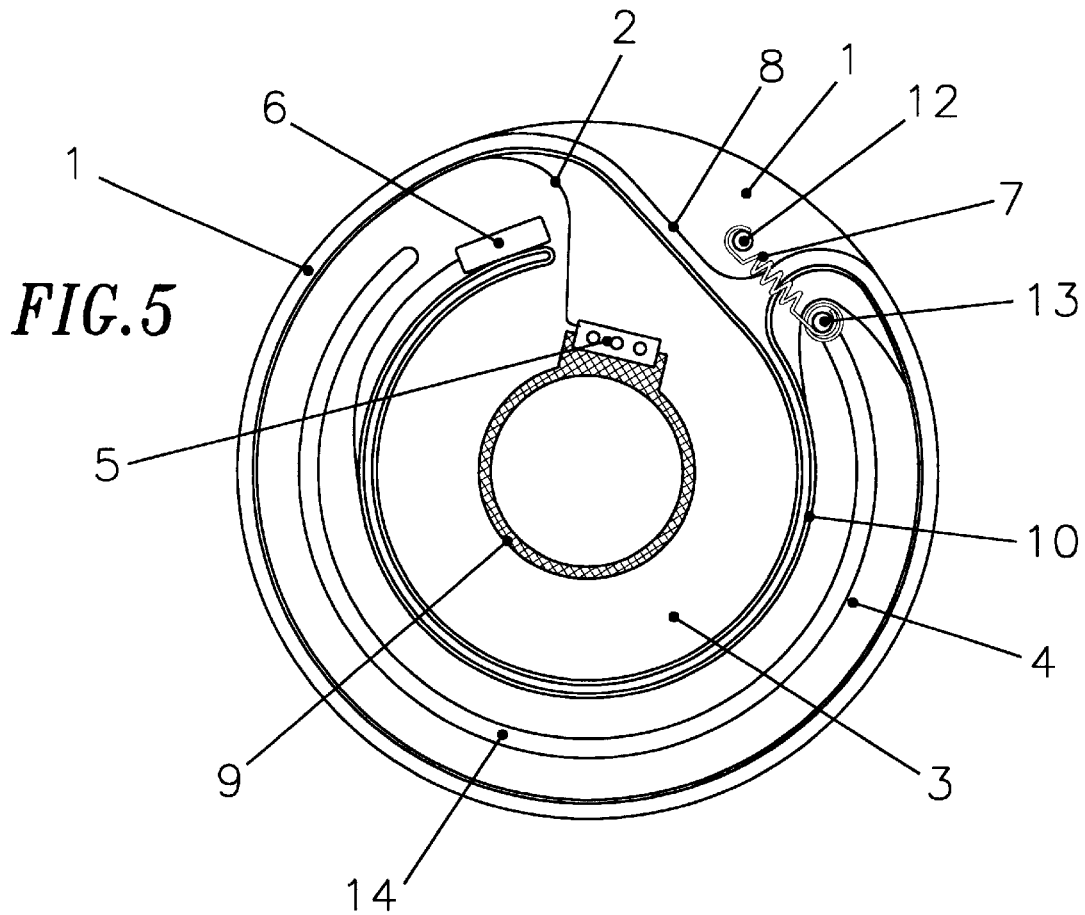
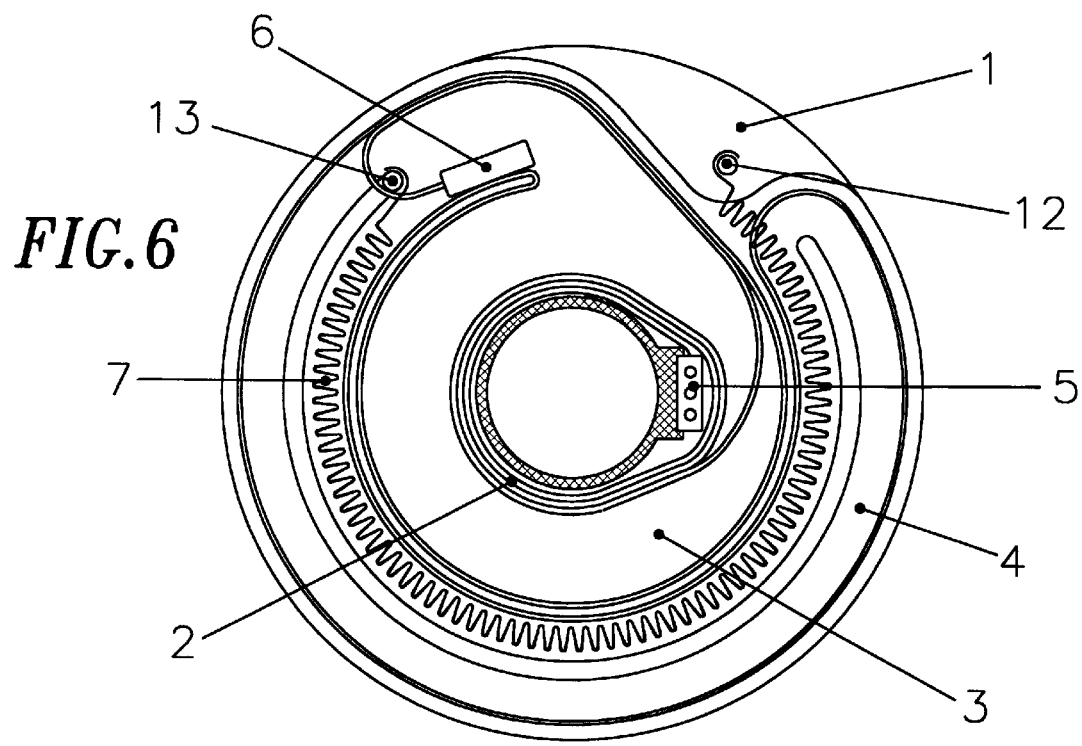

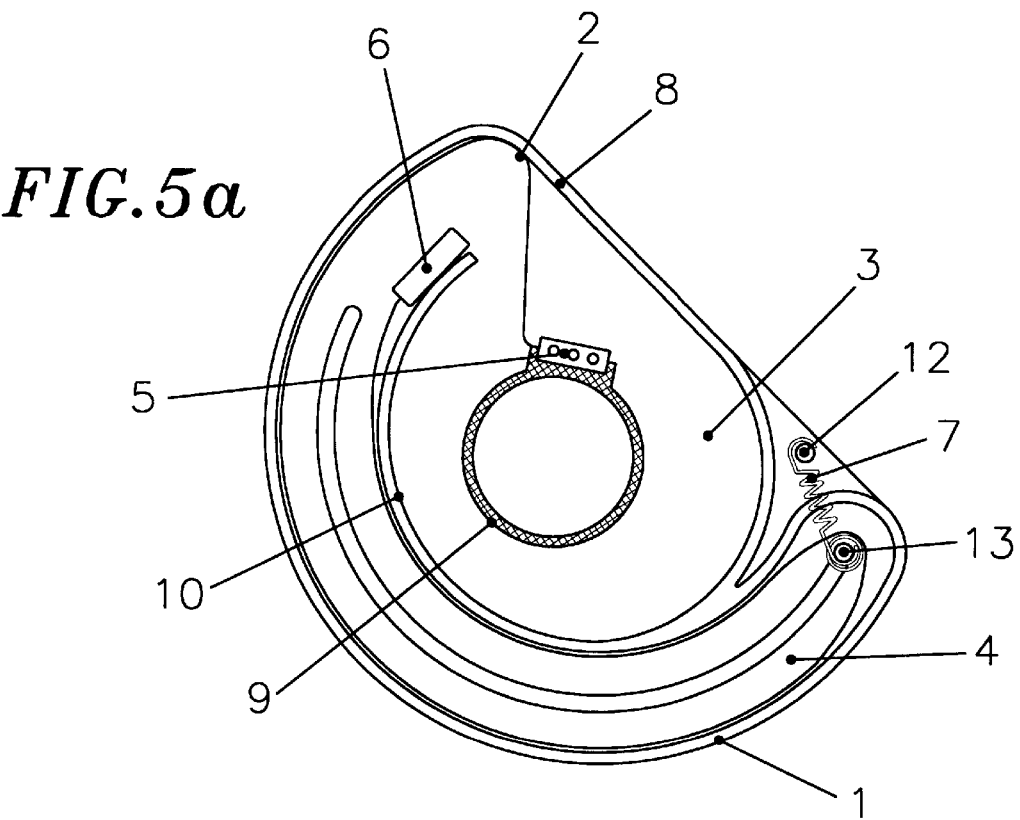
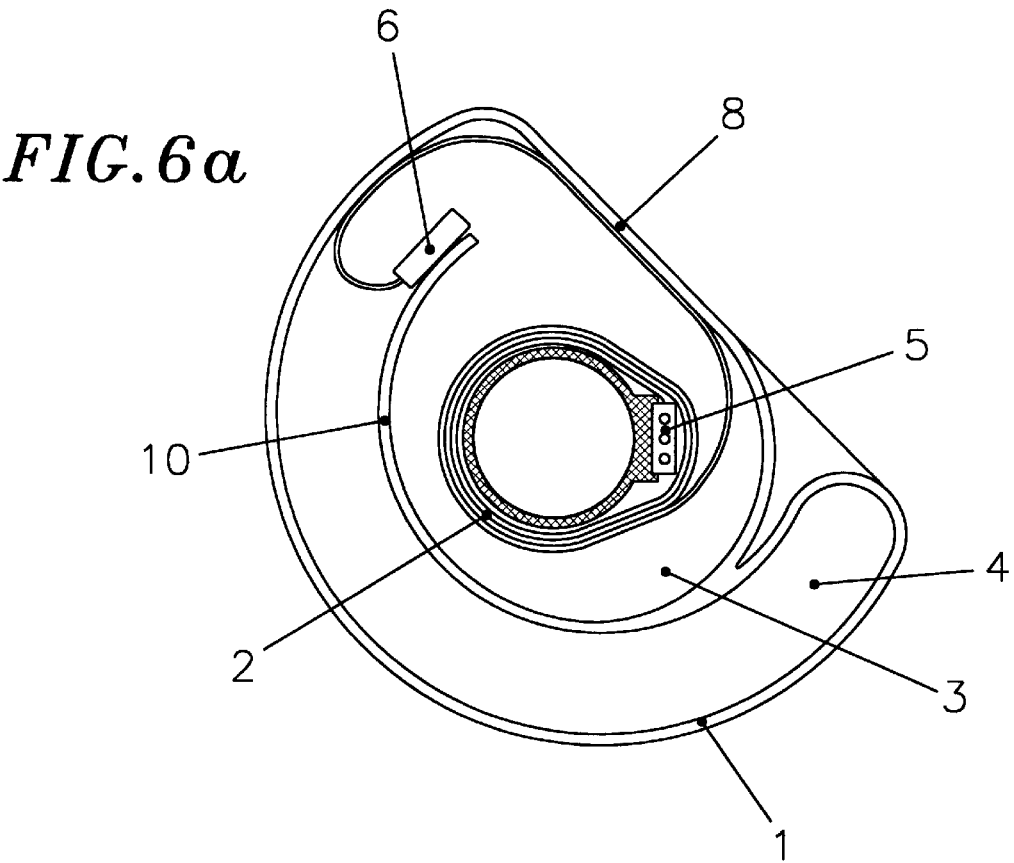

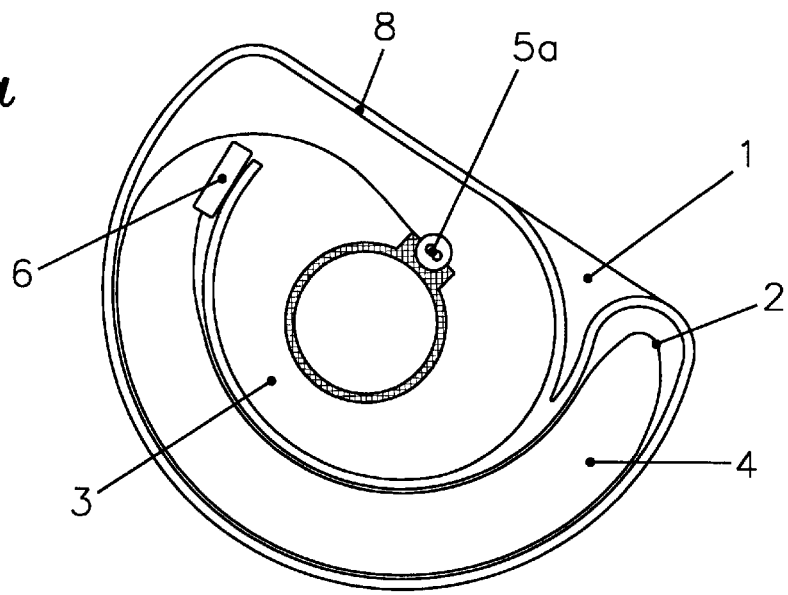
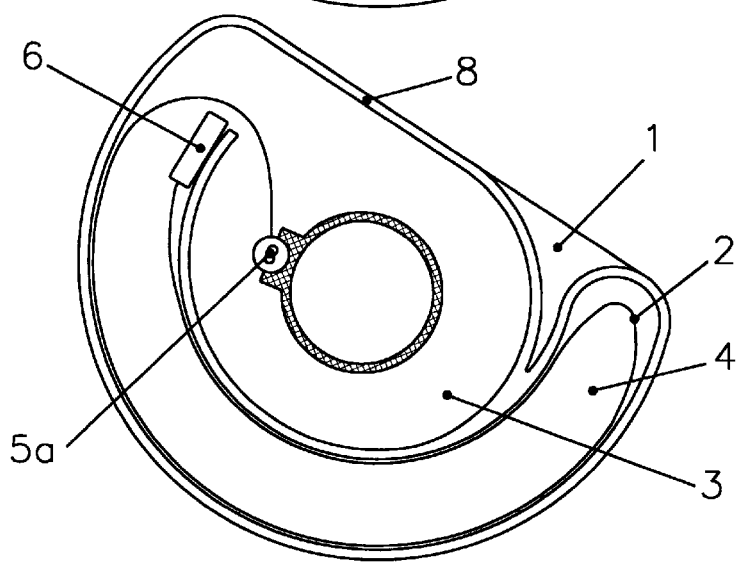
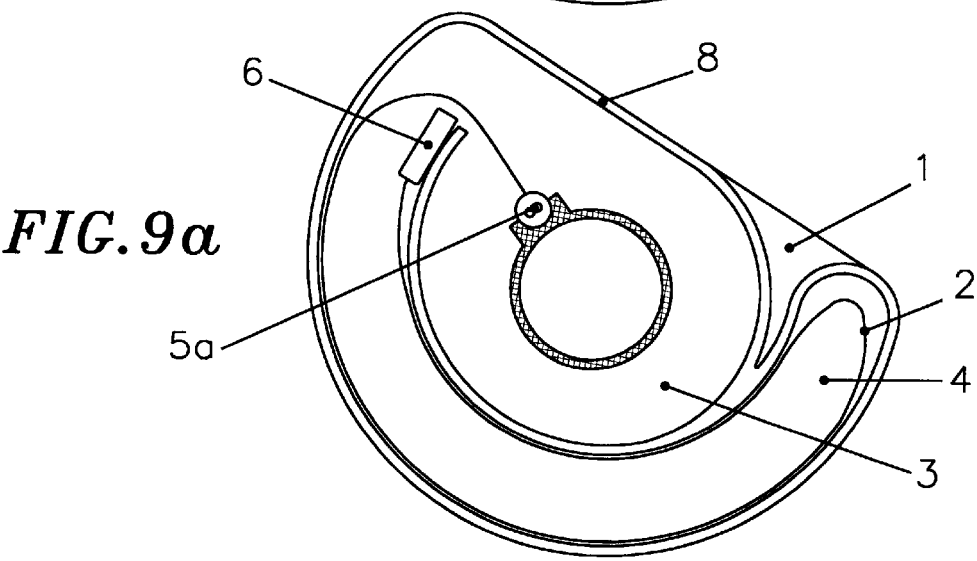

DEVICE FOR TRANSMITTING ELECTRICAL SIGNALS BETWEEN COMPONENTS WHICH CAN BE ROTATED RELATIVE TO ONE ANOTHER

BACKGROUND OF THE INVENTION

The invention concerns transmission devices used, for example, in motor vehicle steering systems to transmit the signals of functional elements disposed on or in the steering wheel.

DE-OS 35 37 783 presents a device for signal transmission whereby an electrical lead is attached to one stationary, and to one rotatable component. A loose guide ring provided with a notch is disposed between the stationary and the rotatable component. The electrical lead is at least partially guided around the guide ring and through the notch of the guide ring and can be wound around the rotatable component inside the guide ring. Upon rotation of the rotatable component, the part of the electrical lead wound up around the guide ring and the part thereof guided around the guide ring are, respectively, shortened or lengthened such that the guide ring is rotated according to the movement of the electrical lead. In one extreme position, the electrical lead is wound up on the rotatable component; in the other extreme position, the electrical lead is unwound and guided between the guide ring and the stationary component.

The device for signal transmission described in DE-OS 35 37 783 has the disadvantage that the possible rotational movement is small compared to the length of the electrical lead.

EP-0 186 935 discloses guiding an electrical lead in a space between a rotatable hub and a stationary housing wall to enlarge the range of rotation for a device for signal transmission. There, the electrical lead is completely unwound from the hub with a rotation of the hub in the clockwise direction and is partially in contact with the inside wall of the stationary housing or is located in the space between the hub and the stationary housing. With counter-clockwise rotation of the hub, the electrical lead is completely wound up on the hub in the end position thereof. In the center position, the electrical lead is partially wound up on the hub.

In the last-mentioned arrangement of the lead, the range of rotation is certainly larger compared to the previously mentioned arrangement. Here, there is, however, the disadvantage that a long lead is essential.

SUMMARY OF THE INVENTION

An embodiment of the invention is a device for transmitting electrical signals between components which can be rotated relative to one another. The device includes a hub rotatable about an axis, a stationary housing surrounding the hub, a stationary component; and at least one electrical lead connected at one end to the hub and at the other end to the stationary component. In a first end position, after full clockwise rotation of the hub, and in a second end position, after full counter-clockwise rotation of the hub, the electrical lead is substantially wound up on the hub in the respective opposite direction, whereas in a center position the electrical lead is substantially unwound from the hub and forms a loop.

In a preferred embodiment, a first chamber is provided to accommodate the electrical lead wound up on the hub and a second chamber is provided for the unwound looped electrical lead. For a conventional number of rotations in steering columns, in a preferred embodiment, the completely unwound loop of the electrical lead extends by only 180° about the hub. Thus, the housing may be eliminated on the side opposite this space. This free space may be used, for example, for other components in a steering column.

In another embodiment, a stationary annular partition with an opening for passage of the electrical lead is provided between the hub and a stationary housing, and an electrical lead connection is provided on the outside of the partition near the opening. The first chamber is then formed between the hub and the partition, whereas the second chamber is located concentric with it between the stationary housing and the partition. In the two end positions, the electrical lead is wound up on the hub in the first chamber, whereas in the center position of the hub, it lies in the second chamber as a loop.

In another embodiment, the second chamber extends from the side of the stationary housing. In this embodiment, the first chamber is the space between the stationary housing and the hub and the second chamber opens into a side of the first chamber. The electrical connection, which must be installed on a stationary component, is provided near this transition between the first to the second chamber. In the center position of the hub, the electrical lead lies looped in this second side chamber.

To assist in the formation of a loop during the unwinding of the electrical lead from the hub, it is advantageous to provide a loop guide in the second chamber to control the direction of movement of the loop. A connecting partition between the stationary housing and the partition may be provided as the loop guide.

Preferably, the point of reversal of the loop lies in a region outside the electrical connections, such that optimal unwinding conditions for the loop are possible.

Another advantageous embodiment of the invention provides that an element permanently applying tension to the loop of the electrical lead is provided such that when there is no torque on the hub, it is returned to and held in its center position. As a tension element, for example, a tension spring may be provided.

To reduce the bending stress on the electrical lead when it is wound in different directions, it is advantageous to attach the hub-side electrical connection rotatably on the hub, specifically rotatably around an axis parallel to the axis of rotation of the hub.

For the same reason, it is advantageous to also mount the stationary component side of the electrical lead connection rotatably on the stationary component, specifically rotatably around an axis parallel to the axis of rotation of the hub.

In one embodiment, the housing of the device according to the invention has an annular cross-section. In another embodiment, the housing has an annular cross-section with a flat wall positioned on one side on a chord of the circle. In this embodiment of the housing, the flat wall sections of a portion of the housing which is not needed for the unwound cable. The space thus gained can be used, for example, in the application to a steering column, for the incorporation of other components.

DESCRIPTION OF THE DRAWINGS

The invention is illustrated in exemplary embodiments with reference to drawings. They depict:

FIG. 2a is a view similar to FIG. 2 but showing the embodiment of FIG. 1a;

FIG. 3a is a view similar to FIG. 3 but showing the embodiment of FIG. 1a;

FIG. 5 is a view of an embodiment having additional loop guidance, whereby the hub is in its center position;

FIG. 5a is a view similar to FIG. 5 but showing a different embodiment;

FIG. 6 is a view of the embodiment shown in FIG. 5, whereby the hub is in its end position after clockwise rotation;

FIG. 6a is a view of a schematic similar to FIG. 6 but showing the embodiment of FIG. 5a and not showing the tension spring and bolt arrangement;

FIG. 7a is a view similar to that of FIG. 7 but showing a different embodiment;

FIG. 8a is a view similar to that of FIG. 8 but showing the embodiment of FIG. 7a;

FIG. 9a is a view similar to that of FIG. 9 but showing the embodiment of FIG. 7a;

DETAILED DESCRIPTION OF THE INVENTION

Figure 1:
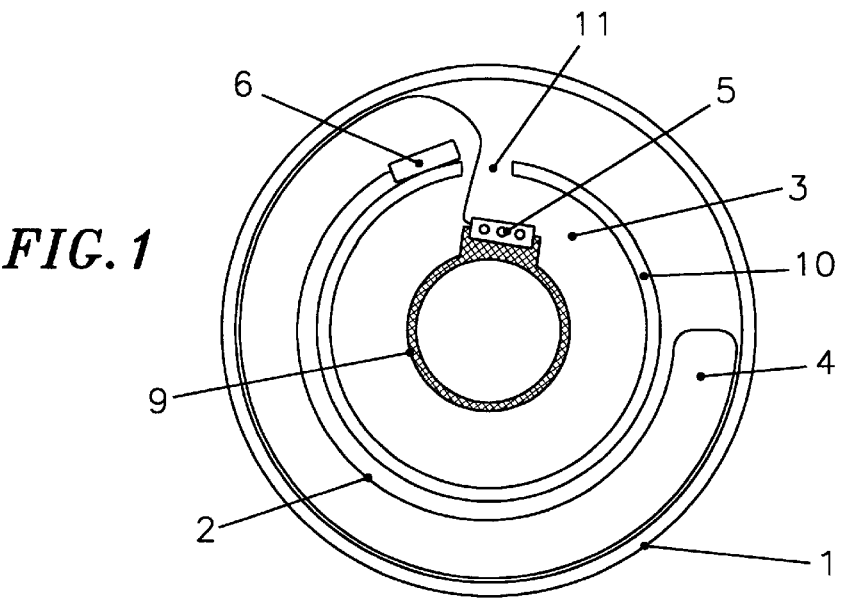
FIG. 1 is a view of a device according to an embodiment of the invention with a wall between a rotatable hub and a stationary housing, whereby the hub is in a center position.
Figure 2:
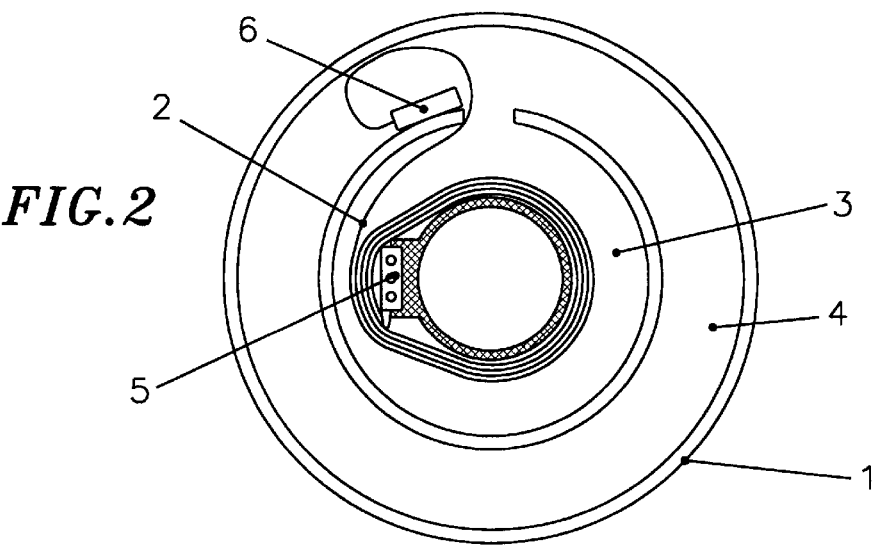
FIG. 2 is a view of a device according to the embodiment of FIG. 1, whereby the hub is in its end position after counterclockwise rotation.
Figure 3:
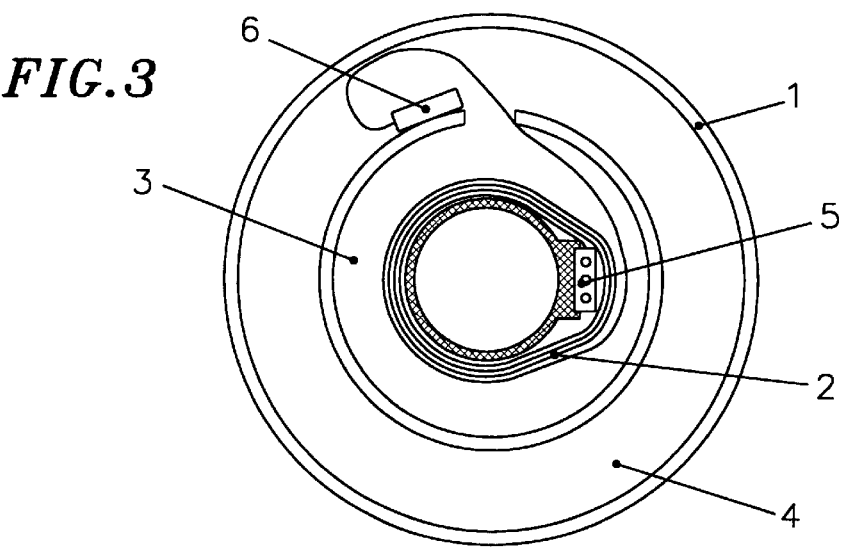
FIG. 3 is a view of a device according to the embodiment of FIG. 1, whereby the hub is in its end position after clockwise rotation.

The embodiment of the device according to the invention depicted in FIGS. 1–3 has a housing 1 as well as a hub 9, such as a steering wheel hub, between which an electrical lead 2 extends. Between the hub 9 and the housing 1 runs a stationary partition 10 concentric with the hub 9 and with the housing 1, forming two concentric chambers, a first internal chamber 3 and a second external chamber 4. The partition 10 has an opening 11 through which the electrical lead 2 is guided.

In FIG. 1, the hub 9 is in a center position. In this position, the lead 2 is completely unwound from the hub and extends through the opening 11 from a lead connection (also called hub connection) 5 on the hub 9 into the second chamber 4. The lead is guided as a loop along the wall of the housing 1 and of the partition 10 to a lead connection (also called stationary partition connection) 6 on the stationary partition. Preferably, the hub connection 5 and the stationary partition connection 6 lie immediately opposite each other in this center position.

When the hub is rotated counterclockwise, the lead is drawn out of the second chamber into the first chamber and winds around the hub 9. FIG. 2 depicts the hub in its end position in this direction of rotation. The lead is now almost completely wound up on the hub 9.

Upon rotation of the hub from this end position in the clockwise direction, the lead is first pushed in the form of a loop into the second chamber until the center position of FIG. 1 is reached. When the hub rotates farther in the clockwise direction, the lead is again drawn out of the second chamber and now winds in the opposite direction on the hub 9. The end position in this direction of rotation is depicted in FIG. 3. In this end position, the lead is again almost completely wound up on the hub 9.

The advantage of this arrangement resides in that the electrical lead requires only a minimal length for the multiple clockwise and counterclockwise rotations of the hub, such that in the unwound state according to FIG. 1, the lead requires only a portion of the second chamber. The unused space in the second chamber in FIG. 1 can consequently be divided off and used for other components. FIGS. 1a–3a depict an embodiment with a housing thus reduced in size.

Figure 1A:
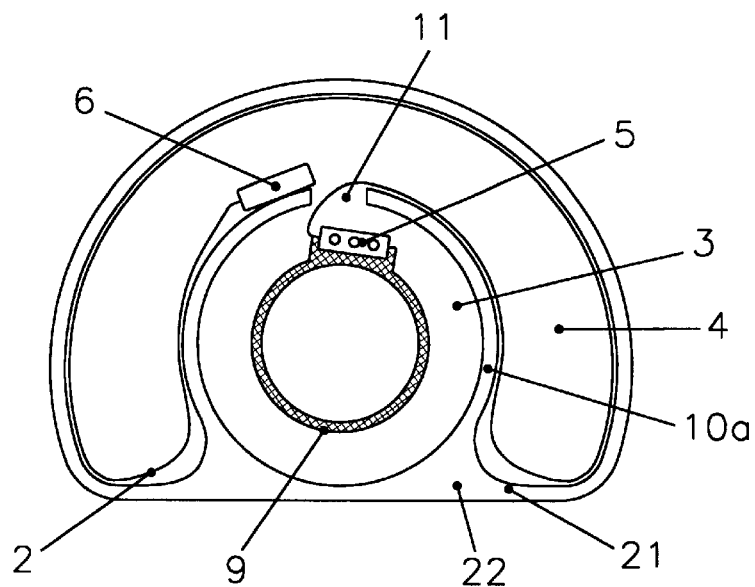
FIG. 1a is a view similar to FIG. 1 but showing another embodiment.
Figure 2A:
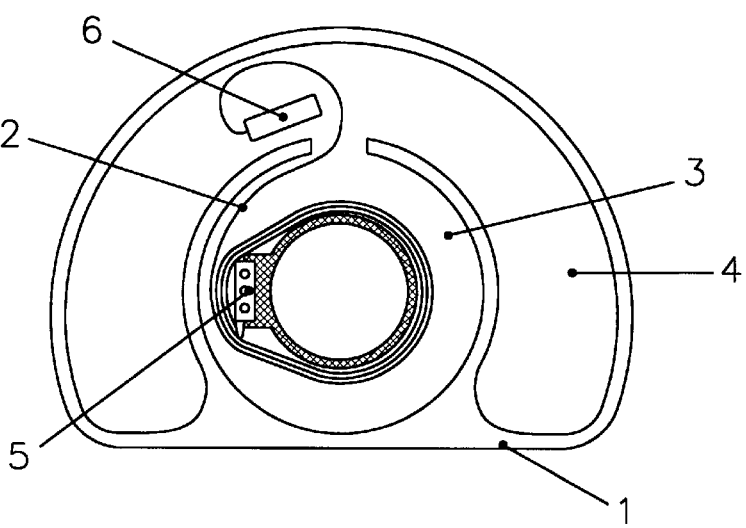
Figure 3A:
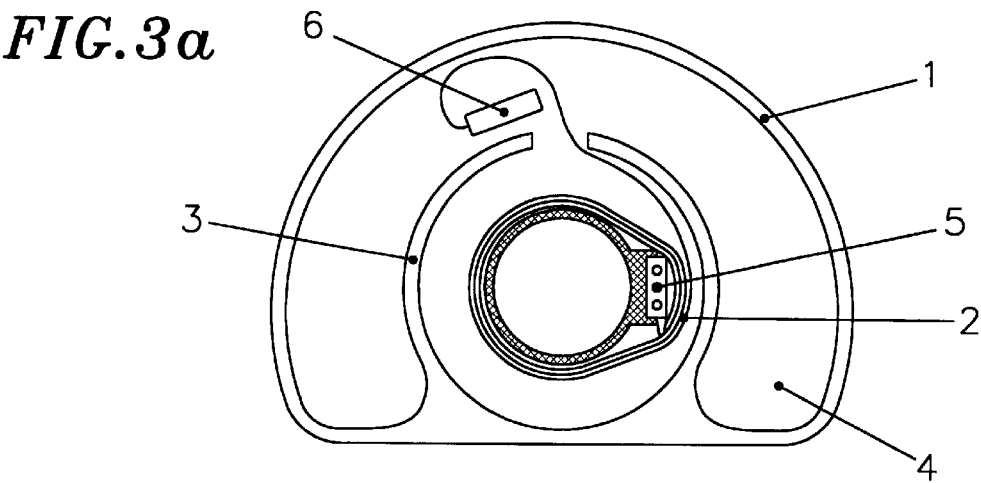

In the exemplary embodiment of FIG. 1a, a housing 21 is provided, which has an annular cylindrical cross-section substantially like that in FIG. 13, which cross-section is, however, flattened on one side such that there is a flat wall 22. From it, the partition 10a also extends in the direction of the hub 9. In contrast to the exemplary embodiments of FIGS. 1–3, the first chamber 3 is consequently formed not only by the partition but also by the partition 10a and the flat wall 22 as part of the housing. The free space created as a result of the flattening of the cylindrical cross-section in proximity to the flat wall 22 contrasted with the exemplary embodiment of FIGS. 1–3 may be used for the installation of other components. FIGS. 2a–3a depict, analogously to FIGS. 2–3, the hub 9 in its end position in the two directions of rotation.

Figure 4:
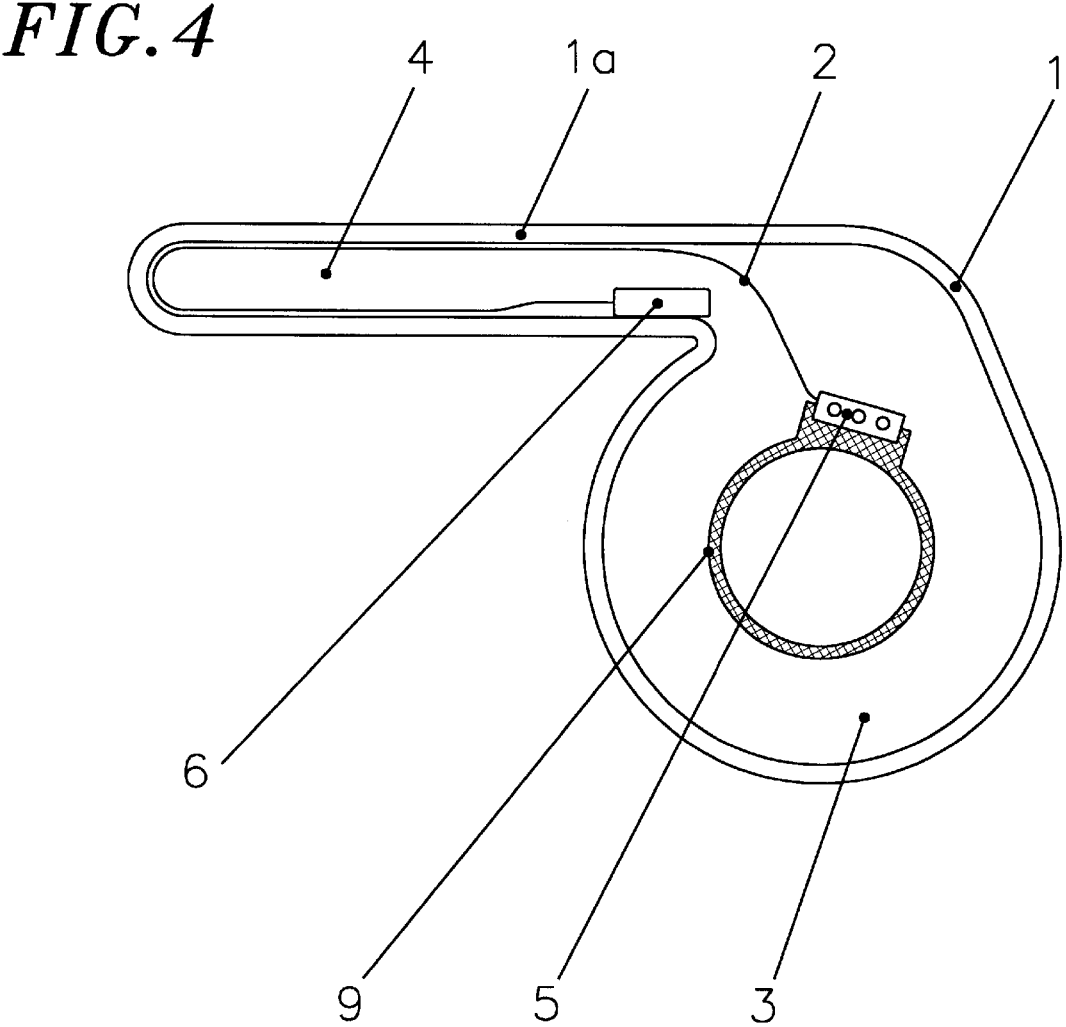
FIG. 4 is a view of an embodiment of the device with a side chamber extending from the stationary housing for the unwound electrical lead.

In the exemplary embodiment of FIG. 4, the housing 1 has a side extension 1a which encloses the second chamber 4. The first chamber 3 extends between the hub 9 and the housing 1. The lead connection 6 is located in the extension 1a at the transition to the first chamber 3. FIG. 4 again depicts the center position of the hub, in which the lead is unwound from the hub and is located in the second chamber in the form of a loop.

In the exemplary embodiment of FIG. 5, a partition 10 is provided which has loop guidance. A connecting partition 8 between the housing 1 and the partition 10 serves as a loop guide. This connecting partition 8 further improves the guidance of the loop in the second chamber. Moreover, in this exemplary embodiment, a tension spring 7 is provided whose role is to hold the loop in the second chamber in its end position and thus to hold the hub 9 in its center position. The tension spring 7 is attached to two bolts 12, 13. Bolt 12 is stationary in the housing and the bolt 13 moves along a guide path 14 inside the second chamber 4. Hence, the arrangement consisting of tension spring 7 and bolts 12, 13 also acts as a loop guide.

In FIG. 5, the hub 9 is depicted in its center position in which the lead is located almost completely inside the second chamber 4. The hub is biased in this center position by the almost completely relaxed tension spring 7, which is depicted here in a simplified manner. Upon clockwise or counterclockwise rotation of the hub 9, the lead is drawn out of the chamber 4 and winds, as depicted in FIG. 6 for clockwise rotation, onto the hub 9. In this process, the loop takes the bolt 13 along, whereby the tension spring 7 is stretched. The stretched tension spring assists the reversal of the hub into the center position, in which the tension spring again assumes the position depicted in FIG. 5.

FIGS. 5a–6a depict a variant exemplary embodiment of FIGS. 5–6. In this embodiment, similar to the exemplary embodiment of FIGS. 1a–3a, a housing with a annular cylindrical cross-section flattened on one side is provided. On this side, the connector 8 between the housing 1 and the partition 10 also forms the wall of the housing. FIG. 6a is a simplified depiction of the hub 9 in its end position in clockwise rotation with tension spring 7 and bolts 12, 13 not shown.

As may be seen in particular in FIGS. 1–3, with clockwise rotation of the hub 9, the lead lies tangentially on the hub at the hub connection 5. Upon counterclockwise rotation of the hub 9, the lead is first reversed and bent at the connection point by the approximately 180° and lies against the hub only after that. At the stationary partition connection 6 of the lead in the exemplary embodiment of FIGS. 1–3, the lead is reversed and bent by 180° from the connection point when the lead is wound up on the hub 9 in both directions of rotation. In these cases, the lead is subjected to bending at the hub connection 5 and stationary partition connection 6 of the lead.

Figure 7:
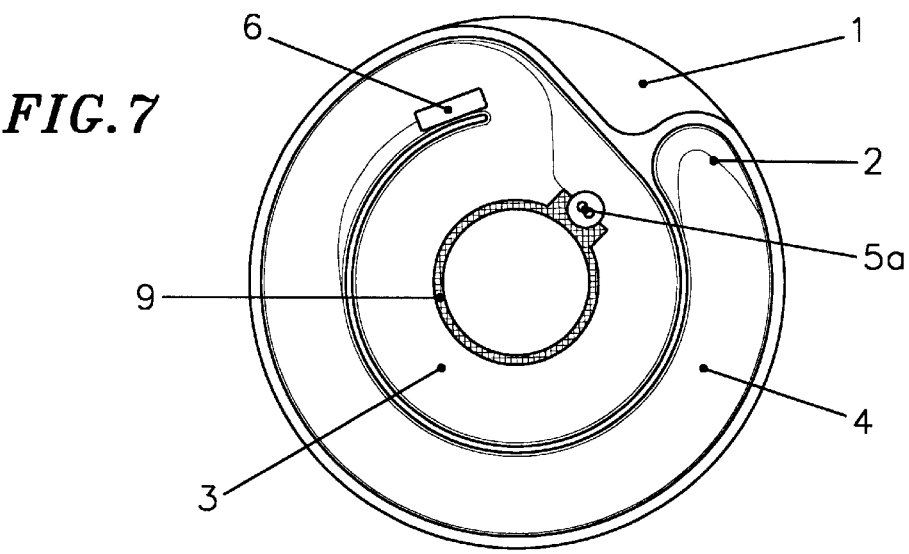
FIG. 7 is a cross sectional view of an embodiment of the invention with a rotatable electrical lead connection in one rotational position of the hub.
Figure 8:
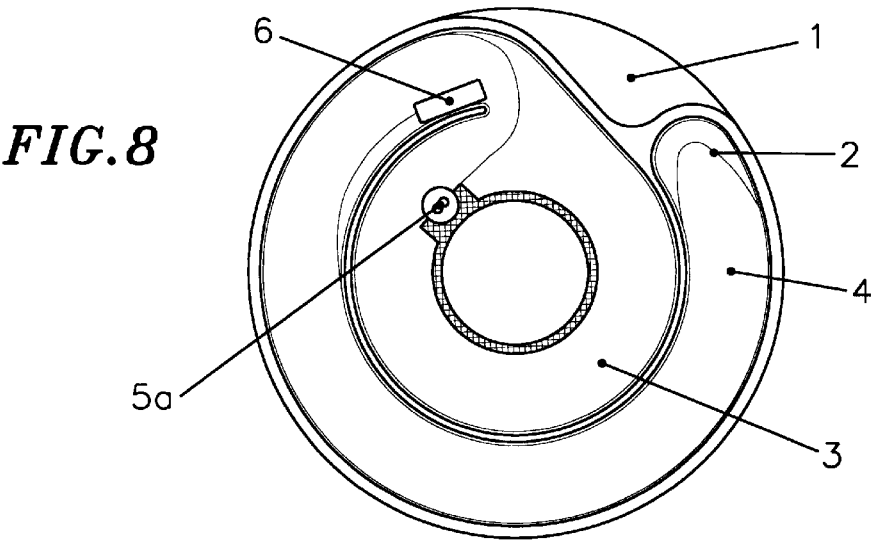
FIG. 8 is a cross sectional view of the embodiment of FIG. 7 with a rotatable electrical lead connection in another rotational position of the hub.
Figure 9:
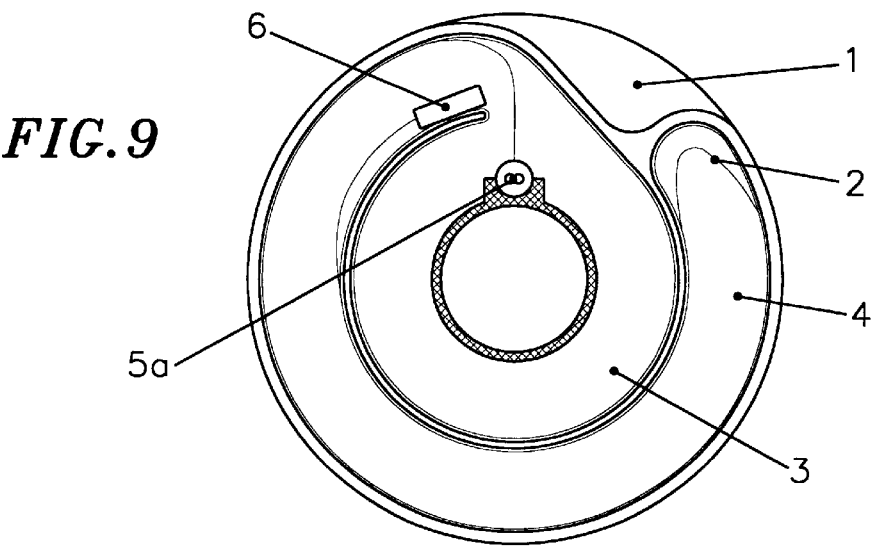
FIG. 9 is a cross sectional view of the embodiment of FIG. 7 with a rotatable electrical lead connection in yet another rotational position of the hub.
Figure 10:
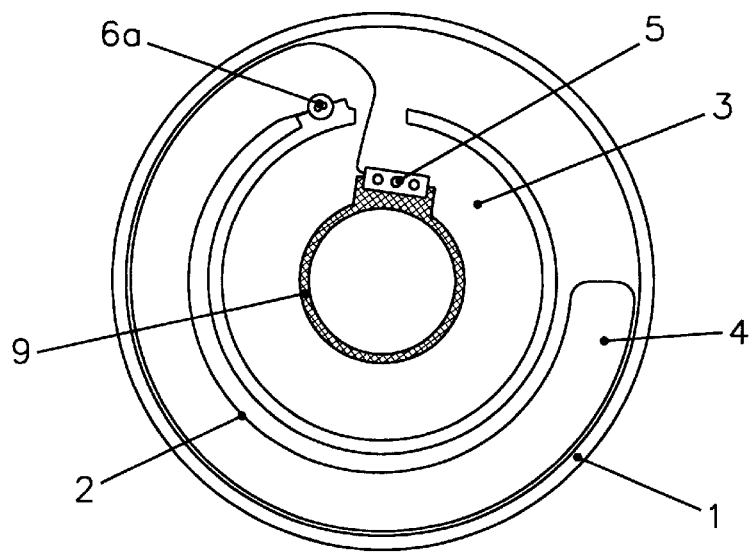
FIG. 10 is a view of an embodiment of the invention with a rotatable electrical lead connection on the wall between the hub and the housing, whereby the hub is in its center position.
Figure 11:
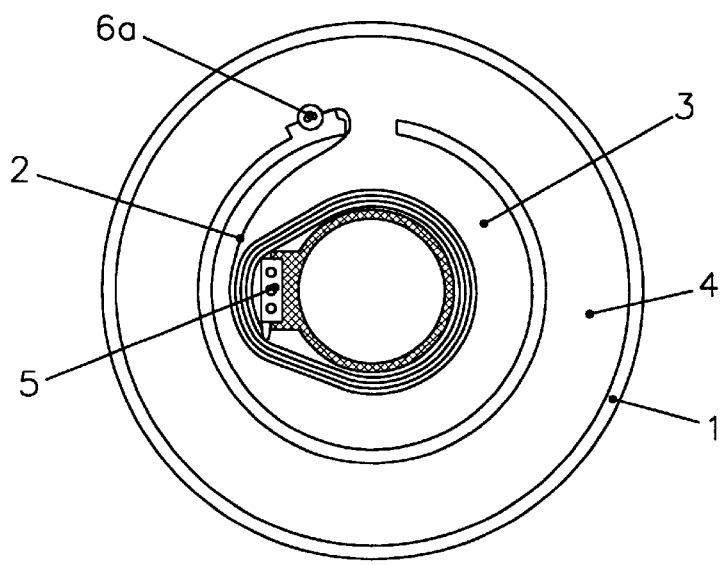
FIG. 11 is a view of the embodiment of FIG. 10 with a rotatable electrical lead connection on the wall between the hub and the housing, whereby the hub is in its end position after counterclockwise rotation.
Figure 12:
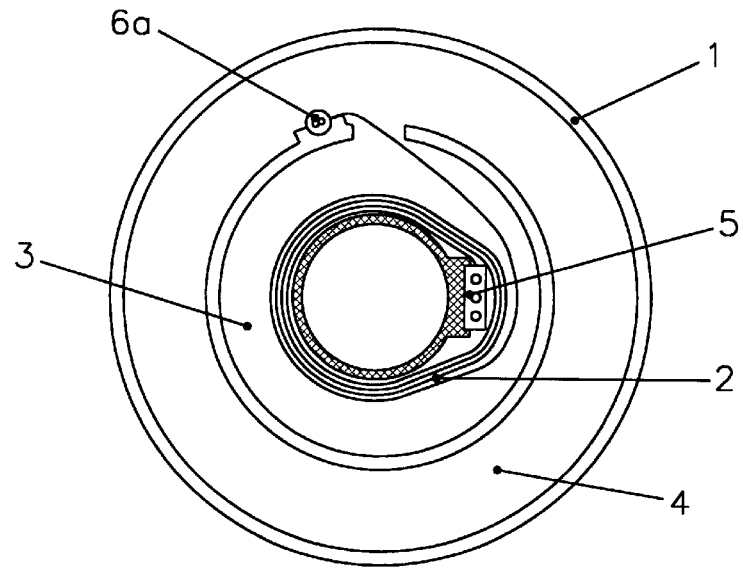
FIG. 12 is a view of the embodiment of FIG. 10 with a rotatable electrical lead connection on the wall between the hub and the housing, whereby the hub is in its end position after clockwise rotation.

In order to ensure that the lead is essentially only subjected to tension at the connections 5 and 6 of the lead, in the exemplary embodiment of FIGS. 7–9, the hub connection 5a of the lead is rotatable and in the exemplary embodiment of FIGS. 10–12, the stationary partition connection 6a of the lead is made rotatable.

From FIG. 7, it may be seen that at the beginning of clockwise rotation of the hub 9, the connection 5a of the lead, which is rotatable around an axis parallel to the axis of rotation of the hub, is rotated into a left position by the lead 2, in which essentially only tension forces, as opposed to bending forces, now act on the lead at the connection point, since the lead is tangential to the hub at the connection.

FIG. 8 shows that at the beginning of counterclockwise rotation, the hub connection 5a of the lead is rotated into a right position by the lead 2, such that in this direction of rotation as well, essentially only tension forces now act on the lead at the connection point, because of the tangential position relative application to the hub at the connection.

In the center position depicted in FIG. 9, the hub connection 5a of the lead also assumes a center position such that the lead comes out of the connection of the lead without being bent.

In FIGS. 7a–9a, the rotatable hub connection 5a of the lead is also depicted for an annular housing cross-section with a flat wall portion.

In FIGS. 10–12, the position of the rotatable connection 6a of the lead is depicted for various positions of the hub. FIG. 10 depicts the center position of the hub, in which the guidance of the lead at the stationary portion connection 6a of the lead corresponds to the guidance of the lead at the stationary portion connection 6 of the lead of FIG. 1. In the end position of the hub after full counterclockwise rotation depicted in FIG. 11, the connection of the lead is rotated by 180°, such that the lead is only bent back by 180°, whereas in the comparable position of the embodiment of FIG. 2, it must be bent back by almost 360° to lie against the hub.

In the end position of the hub 9 depicted in FIG. 12, after full clockwise rotation, the stationary partition connection 6 of the lead has the same position as in FIG. 11. It is possible to see that the lead is essentially subjected only to tension in this position at the connection of the lead.

The advantage of the exemplary embodiments according to FIGS. 7–12 consists, in addition to the further reduction of stress on the leads, in the further shortening of the leads for a given range of rotation of the hub.

I claim:

1. A device for transmitting electrical signals between components which can be rotated relative to one another comprising:
   a hub rotatable about an axis;
   a stationary housing surrounding the hub;
   a stationary component;
   at least one electrical lead connected at one end to the hub and at the other end to the stationary component, wherein in a first end position after full clockwise rotation and in a second end position after full counterclockwise rotation of the hub, the electrical lead is substantially wound up on the hub in the respective opposite direction, and wherein in a center position the electrical lead is substantially unwound from the hub.

2. The device according to claim 1 further comprising:
   a first chamber to accommodate the hub;
   a second chamber to accommodate a loop of the electrical lead unwound from the hub; and
   an opening between the first chamber and the second chamber.

3. The device according to claim 2 wherein the first chamber is adjacent the hub, the second chamber is adjacent the stationary housing, and an electrical lead connection is provided proximate the opening between the first chamber and the second chamber.

4. The device according to claim 1 further comprising a stationary annular partition positioned between the hub and the stationary housing, the partition comprising an opening for passage of the electrical lead and wherein the stationary component comprises an electrical connection for the lead mounted on the outside of the partition near the opening.

5. The device according to claim 4 wherein a first chamber is located between the hub and the partition and a second chamber is located between the stationary housing and the partition.

6. The device according to claim 5 further comprising a loop guide positioned between the first chamber and the second chamber to control the direction of movement of a loop portion of the electrical lead of the electrical lead as the hub is rotated.

7. The device according to claim 6 wherein the loop guide comprises a connecting partition positioned between the stationary housing and the partition.

8. The device according to claim 4 further comprising a loop guide positioned in the second chamber to control the direction of movement of a loop portion of the electrical lead as the hub is rotated.

9. The device according to claim 8 comprising a tension element positioned in an end of the loop portion of the electrical lead in the second chamber and wherein said tension element constantly exerts tension on said end of the loop portion.

10. The device according to claim 8 wherein the tension element comprises a bolt connected to a spring connected between the stationary housing and said bolt.

11. The device according to claim 1 further comprising an electrical lead connection rotatably attached to the hub.

12. The device according to claim 11 wherein the electrical connection on the hub is rotatable around an axis parallel to the axis of the hub.

13. The device according to claim 1 wherein the electrical lead connection is rotatably mounted on the stationary component.

14. The device according to claim 13 wherein the electrical lead connection on the stationary component rotates about an axis parallel to the axis of the hub.

15. The device according to claim 1 wherein the housing has an annular cross-section.

16. The device according to claim 1 wherein the housing has a partially annular cross-section including a flat wall positioned on a chord of the circle.

17. The device according to claim 2 wherein the second chamber is provided on a side of the stationary housing and wherein an electrical lead connection is provided at the opening.

* * * * *